United States Patent
Urabayashi et al.

(10) Patent No.: US 10,701,610 B2
(45) Date of Patent: Jun. 30, 2020

(54) RELAY NODE AND RADIO TERMINAL

(71) Applicant: KYOCERA CORPORATION, Kyoto (JP)

(72) Inventors: Hiroyuki Urabayashi, Yokohama (JP); Kugo Morita, Yokohama (JP); Fangwei Tong, Machida (JP); Atsuhisa Inakoshi, Yokohama (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 44 days.

(21) Appl. No.: 16/168,905

(22) Filed: Oct. 24, 2018

(65) Prior Publication Data

US 2019/0059035 A1 Feb. 21, 2019

Related U.S. Application Data

(63) Continuation of application No. PCT/JP2017/016496, filed on Apr. 26, 2017.

(30) Foreign Application Priority Data

Apr. 26, 2016 (JP) .................................. 2016-088308

(51) Int. Cl.
  *H04W 36/30* (2009.01)
  *H04W 84/00* (2009.01)
  (Continued)

(52) U.S. Cl.
  CPC ........ *H04W 36/305* (2018.08); *H04B 7/2606* (2013.01); *H04L 1/18* (2013.01);
  (Continued)

(58) Field of Classification Search
  None
  See application file for complete search history.

(56) References Cited

U.S. PATENT DOCUMENTS

| 8,402,335 | B2 * | 3/2013 | Doppler | H04L 1/1614 |
| | | | | 714/749 |
| 8,620,302 | B2 * | 12/2013 | Gunnarsson | H04W 8/26 |
| | | | | 370/315 |

(Continued)

FOREIGN PATENT DOCUMENTS

| JP | 2010-263297 A | 11/2010 |
| JP | 2011-509052 A | 3/2011 |

(Continued)

OTHER PUBLICATIONS

3rd Generation Partnership Project; "Technical Specification Group Radio Access Network; Evolved Universal Terrestrial Radio Access (E-UTRA) and Evolved Universal Terrestrial Radio Access Network (E-UTRAN)"; 3GPP TS 36.300 V13.3.0; Mar. 2016; pp. 1-295; Release 13; 3GPP Organizational Partners.

*Primary Examiner* — Bunjob Jaroenchonwanit
(74) *Attorney, Agent, or Firm* — Studebaker & Brackette PC

(57) ABSTRACT

A relay node according to one embodiment comprises a controller configured to establish a connection with a radio terminal and to establish a connection with a base station; a receiver configured to receive information of the radio terminal from the base station; and a transmitter configured to transmit the information to the radio terminal. The receiver receives delivery acknowledgement information from the radio terminal before the information is transmitted. The delivery acknowledgement information indicates that the radio terminal has received the information. The transmitter stops transmitting the information to the radio terminal in response to reception of the delivery acknowledgement information.

9 Claims, 14 Drawing Sheets

(51) Int. Cl.
*H04L 1/18* (2006.01)
*H04W 16/26* (2009.01)
*H04W 76/28* (2018.01)
*H04B 7/26* (2006.01)
*H04W 40/22* (2009.01)
*H04W 88/04* (2009.01)
*B61L 15/00* (2006.01)

(52) U.S. Cl.
CPC ........... *H04W 16/26* (2013.01); *H04W 40/22* (2013.01); *H04W 76/28* (2018.02); *H04W 84/00* (2013.01); *H04W 88/04* (2013.01); *B60L 2200/26* (2013.01); *B61L 15/0027* (2013.01); *H04W 84/005* (2013.01); *Y02D 70/00* (2018.01); *Y02D 70/20* (2018.01); *Y02D 70/24* (2018.01)

(56) References Cited

U.S. PATENT DOCUMENTS

| | | | | |
|---|---|---|---|---|
| 8,744,342 B2* | 6/2014 | Brunel | ............... | H04W 88/04 455/9 |
| 8,761,059 B2* | 6/2014 | Kim | ............... | H04B 7/2606 370/281 |
| 8,767,676 B1* | 7/2014 | Chang | ............... | H04W 36/02 370/254 |
| 9,680,577 B2* | 6/2017 | Kim | ............... | H04L 5/001 |
| 2008/0013482 A1* | 1/2008 | Kurokawa | ............... | H04L 45/122 370/328 |
| 2009/0175214 A1* | 7/2009 | Sfar | ............... | H04B 7/15592 370/315 |
| 2009/0235138 A1* | 9/2009 | Chang | ............... | H04L 1/1854 714/748 |
| 2010/0238845 A1* | 9/2010 | Love | ............... | H04B 7/15528 370/280 |
| 2012/0039243 A1* | 2/2012 | Park | ............... | H04B 7/155 370/315 |
| 2012/0120866 A1* | 5/2012 | Cai | ............... | H04B 7/155 370/315 |
| 2013/0003640 A1* | 1/2013 | Yang | ............... | H04W 72/005 370/312 |
| 2013/0044590 A1* | 2/2013 | Lee | ............... | H04W 76/38 370/228 |
| 2013/0195005 A1* | 8/2013 | Al-Shalash | ........... | H04W 36/16 370/315 |
| 2015/0010010 A1* | 1/2015 | Xie | ............... | H04L 45/04 370/401 |
| 2015/0078253 A1* | 3/2015 | Morosawa | ............... | H04L 69/18 370/328 |
| 2015/0195031 A1* | 7/2015 | Ode | ............... | H04B 7/2606 370/315 |
| 2016/0081004 A1* | 3/2016 | Cai | ............... | H04L 1/16 370/315 |
| 2016/0183162 A1* | 6/2016 | Jeong | ............... | H04W 40/22 370/311 |
| 2016/0338119 A1* | 11/2016 | Bodas | ............... | H04W 76/14 |
| 2017/0142653 A1* | 5/2017 | Qi | ............... | H04B 7/2606 |
| 2018/0184270 A1* | 6/2018 | Chun | ............... | H04W 76/14 |
| 2018/0375613 A1* | 12/2018 | Byun | ............... | H04W 72/1278 |
| 2019/0200288 A1* | 6/2019 | Folke | ............... | H04W 40/125 |
| 2019/0261450 A1* | 8/2019 | Adachi | ............... | H04W 76/14 |

FOREIGN PATENT DOCUMENTS

| | | |
|---|---|---|
| JP | 2012-074757 A | 4/2012 |
| JP | 2014-225859 A | 12/2014 |

* cited by examiner

RELAY NODE AND RADIO TERMINAL

CROSS-REFERENCE TO RELATED APPLICATION

The present application is a continuation based on PCT Application No. PCT/JP2017/016496 filed on Apr. 26, 2017, which claims the benefit of Japanese Patent Application No. 2016-088308 (filed on Apr. 26, 2016). The content of which is incorporated by reference herein in their entirety.

FIELD

The present disclosure relates to a relay node and a radio terminal.

BACKGROUND

In 3GPP (3rd Generation Partnership Project) which is a project aiming to standardize a mobile communication system, specifications of a relay node (RN) have been designed (see Non Patent Document 1).

On behalf of a base station, the relay node having a functionality of the base station can provide a service to a radio terminal. Currently, the relay node is used mainly to compensate a coverage of the base station.

PRIOR ART DOCUMENT

Non-Patent Document

Non Patent Document 1; 3GPP Technical Specification "TS 36.300 V13.3.0" Apr. 1, 2016

SUMMARY

A relay node according to one embodiment comprises a controller configured to establish a connection with a radio terminal and to establish a connection with a base station; a receiver configured to receive information of the radio terminal from the base station; and a transmitter configured to transmit the information to the radio terminal. The receiver receives delivery acknowledgement information from the radio terminal before the information is transmitted. The delivery acknowledgement information indicates that the radio terminal has received the information. The transmitter stops transmitting the information to the radio terminal in response to reception of the delivery acknowledgement information.

A radio terminal according to one embodiment comprises a controller configured to establish a connection with a relay node; a receiver configured to attempt to receive, from a base station, information of the radio terminal to the relay node, and a transmitter configured to transmit, in response to successful reception of the information from the base station, delivery acknowledgement information indicating that the radio terminal has received the information to the relay node.

A relay node according to one embodiment comprises a controller configured to establish a connection with a radio terminal; a receiver configured to receive information of the radio terminal to the radio terminal from a base station; and a transmitter configured to transmit the information to the radio terminal only when a transmission request for the information is received from the radio terminal.

A radio terminal according to one embodiment comprises a controller configured to establish a connection with a base station and to establish a connection with a relay node; a receiver configured to receive information of the radio terminal from the base station; and a transmitter configured to transmit a transmission request for the information to the relay node when the receiver fails to receive the information.

DESCRIPTION OF THE EMBODIMENT

Overview of Embodiment

Figure 1:
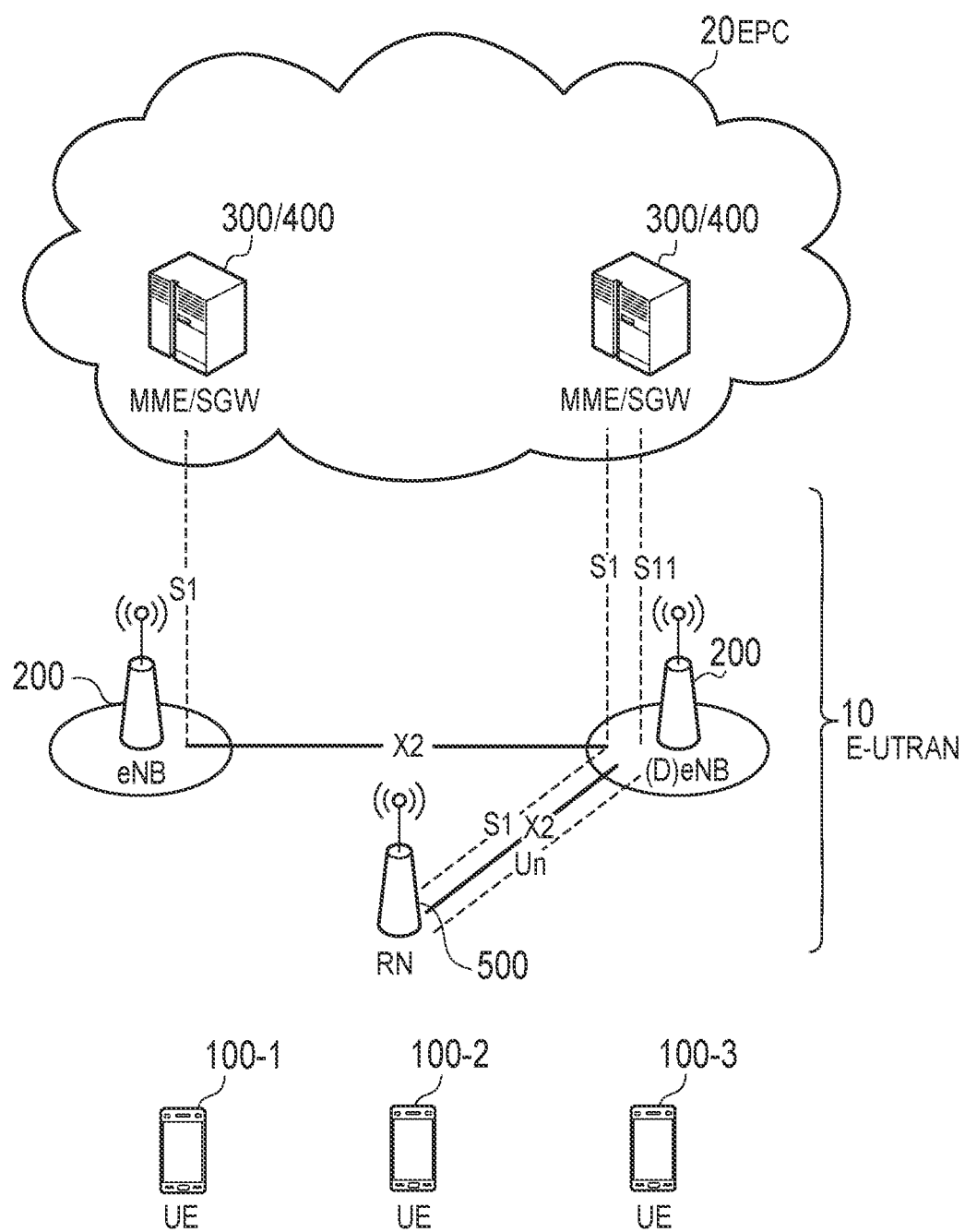
FIG. 1 is a diagram illustrating a configuration of an LTE system.

In recent years, it has been proposed to install a relay node in a moving body (for example, a train) accommodating a plurality of radio terminals. When the relay node executes communication with a base station on behalf of the plurality of radio terminals while the moving body is traveling, a resource use efficiency is improved.

However, when the moving body moves at high speed, since the radio environment between the relay node and the base station changes every moment, communication throughput between the relay node and the base station may not be sufficiently secured.

A relay node according to one embodiment may comprise a controller configured to establish a connection with a radio terminal and to establish a connection with a base station; a receiver configured to receive information of the radio terminal from the base station; and a transmitter configured to transmit the information to the radio terminal. The receiver may receive delivery acknowledgement information from the radio terminal before the information is transmitted. The delivery acknowledgement information may indicate that the radio terminal has received the information. The transmitter may stop transmitting the information to the radio terminal in response to reception of the delivery acknowledgement information.

The transmitter may transmit a retransmission request for the information to the base station when the receiver fails to receive the information. The transmitter may, even when the receiver has failed to receive the information, stop transmitting the retransmission request to the base station in response to reception of the delivery acknowledgement information.

The transmitter may transmit identification information used to decode the information to the radio terminal. The identification information may be information that is assigned to the relay node by the base station.

The transmitter may transmit identification information used to decode the information to both the radio terminal and the base station. The identification information may be information that is assigned to the radio terminal by the relay node.

The transmitter may transmit, to the radio terminal, information on a period in which the relay node monitors a radio signal from the base station during discontinuous reception.

The receiver may receive control information from the base station. The control information may include resource information used for which the relay node transmits the information to the radio terminal.

A radio terminal according to one embodiment may comprise a controller configured to establish a connection with a relay node; a receiver configured to attempt to receive, from a base station, information of the radio terminal to the relay node, and a transmitter configured to transmit, in response to successful reception of the information from the base station, delivery acknowledgement information indicating that the radio terminal has received the information to the relay node.

The receiver may receive identification information used to decode the information from the relay node. The identification information may be information that is assigned to the relay node by the base station.

The receiver may receive identification information used to decode the information from the relay node. The identification information may be information that is assigned to the radio terminal by the relay node.

The receiver is may receive information on a period in which the relay node monitors a radio signal from the base station during discontinuous reception.

The receiver may receive control information from the base station. The control information may include resource information used for which the relay node transmits the information to the radio terminal. The receiver may receive the information from the relay node based on the resource information.

A relay node according to one embodiment may comprise a controller configured to establish a connection with a radio terminal; a receiver configured to receive information of the radio terminal to the radio terminal from a base station; and a transmitter configured to transmit the information to the radio terminal only when a transmission request for the information is received from the radio terminal.

The transmitter may transmit, to the radio terminal, delivery acknowledgement information indicating whether the relay node has received the information.

A radio terminal according to one embodiment may comprise a controller configured to establish a connection with a base station and to establish a connection with a relay node; a receiver configured to receive information of the radio terminal from the base station; and a transmitter configured to transmit a transmission request for the information to the relay node when the receiver fails to receive the information.

The transmitter may transmit the transmission request only when delivery acknowledgement information indicating that the relay node has received the information is received.

The transmitter may transmit a retransmission request for the information to the base station when the receiver fails to receive the information. The transmitter may stop transmitting the retransmission request to the base station in response to the information received from the relay node even when the receiver has failed to receive the information.

Overview of System (Mobile Communication System)

Hereafter, a Long Term Evolution (LTE) system that is a mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a radio terminal. The UE 100 is a mobile communication apparatus. The UE 100 can perform radio communication with a cell (later described eNB 200 or RN 500).

The E-UTRAN 10 corresponds to a radio access network. The E-UTRAN 10 includes an evolved Node-B (eNB) 200 and a Relay Node (RN) 500.

The eNB 200 corresponds to a base station. The eNBs 200 are connected to each other via an X2 interface.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The RN 500 corresponds to a relay device. The RN 500 can relay data of the UE 100 between the UE 100 and the eNB 200. The RN 500 is wirelessly connected to the eNB 200 via a Un interface. The eNB 200 to be connected to the RN 500 for the relay has a function of serving the RN 500. Such an eNB 200 is referred to as a Donor eNB (DeNB).

The RN 500 corresponds to a relay node (relay device). The RN 500 can communicate with the UE 100 on behalf of the eNB 200. The RN 500 supports the functionality of the eNB 200. Therefore, the RN 500 may terminate the radio protocol for S1 and X2 interfaces and an E-UTRA (Evolved Universal Terrestrial Radio Access) radio interface.

An S1 interface passing through the (D)eNB 200 may be established between the RN 500 and an MME 300/SGW 400. That is, the RN 500 may be connected to the MME 300/SGW 400 via the S1 interface. The RN 500 may communicate with the MME 300/SGW 400 via the S1 interface. An X2 interface may be established between the RN 500 and the eNB 200 via the eNB (DeNB) 200. That is, the RN 500 may be connected to the eNB 200 via the X2 interface. The RN 500 may communicate with the eNB 200 via the X2 interface.

Further, the RN 500 also supports a part (subset) of the functionality of the UE 100. The RN 500 includes a protocol for a radio interface described later, for example, to be wirelessly connected to the eNB 200 (see FIG. 3).

The EPC 20 corresponds to a core network. The EPC 20 may constitute a network together with the E-UTRAN 10. The EPC 20 includes an MME (Mobility Management Entity) 300 and an SGW (Serving Gateway) 400.

The MME 300 performs, for example, various kinds of mobility control for the UE 100. The SGW 400 performs, for example, data transfer control. The MME 300 and the SGW 400 are connected to the eNB 200 via a S1 interface. The MME 300 and the SGW 400 may be connected to the RN 500 via the S1 interface.

Figure 2:
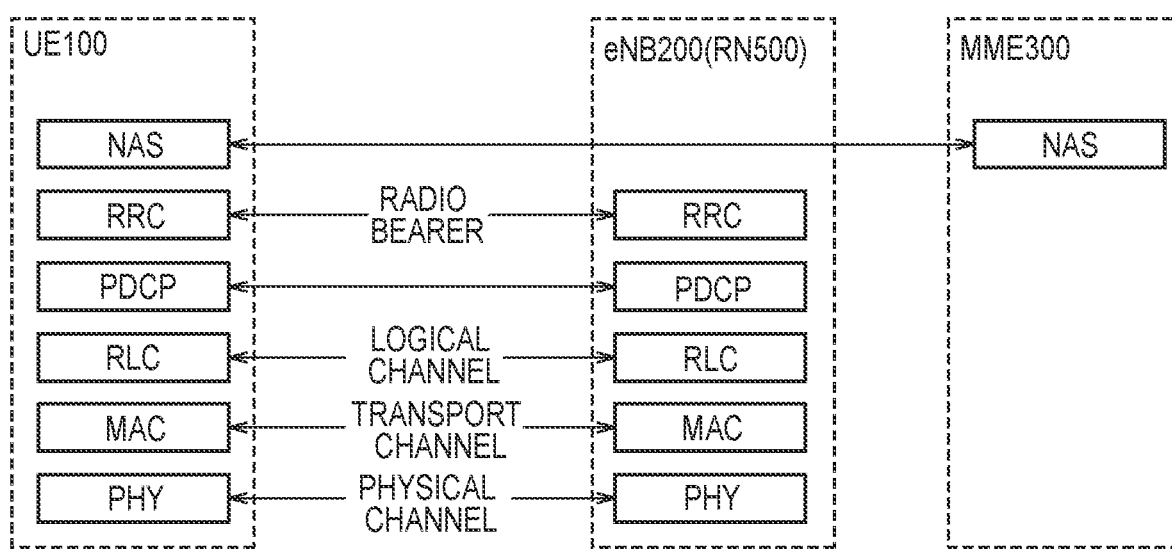
FIG. 2 is a protocol stack diagram of a radio interface in the LTE system.
Figure 3:
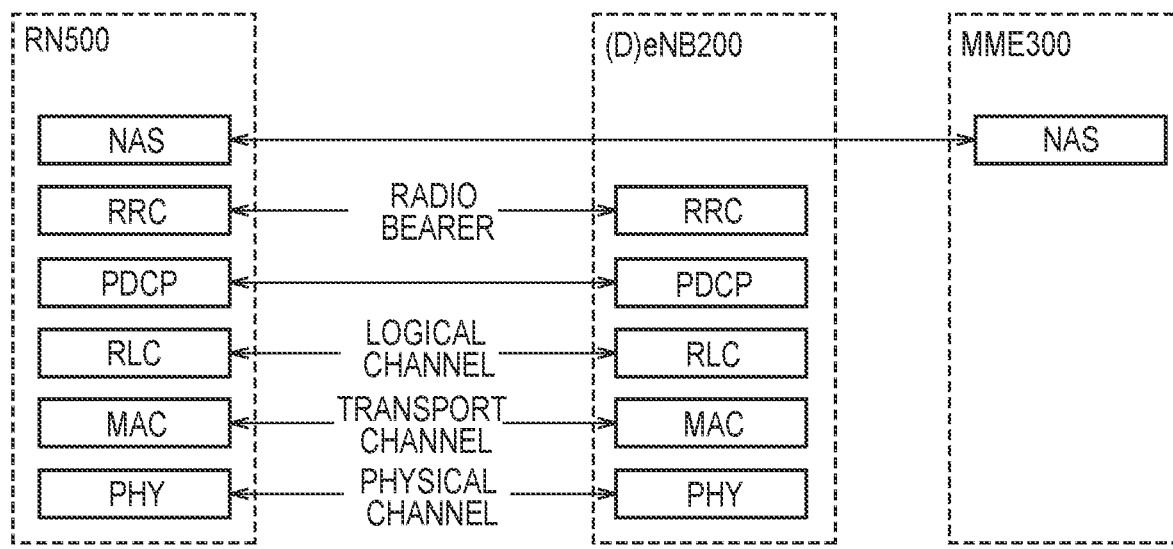
FIG. 3 is a protocol stack diagram of a radio interface in the LTE system.

FIG. 2 and FIG. 3 are diagrams illustrating protocol stack of a radio interface in the LTE system. FIG. 2 illustrates a protocol stack diagram of the radio interface between the UE 100 and the eNB 200. FIG. 3 illustrates a protocol stack diagram of the radio interface between the RN 500 and the eNB 200.

As illustrated in FIG. 2 and FIG. 3, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 (RN 500) and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 (RN 500) and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 (RN 500) and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 (RN 500) and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 (RN 500) and the RRC of the eNB 200, the UE 100 (RN 500) is in an RRC connected state. If there is not a connection (RRC connection) between the RRC of the UE 100 (RN 500) and the RRC of the eNB 200, the UE 100 (RN 500) is in an RRC idle state.

A non-access stratum (NAS) layer located above the RRC layer performs, for example, session management, mobility management, and the like.

Figure 4:
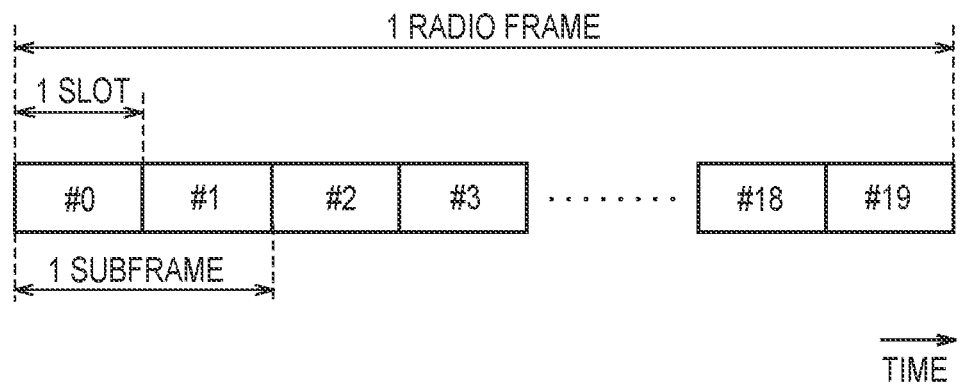
FIG. 4 is a configuration diagram of a radio frame used in an LTE system.

FIG. 4 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 4, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each sub frame is an area that can be used as a physical uplink shared channel (PUSCH) for transmitting uplink data.

(Radio Terminal)

Figure 5:
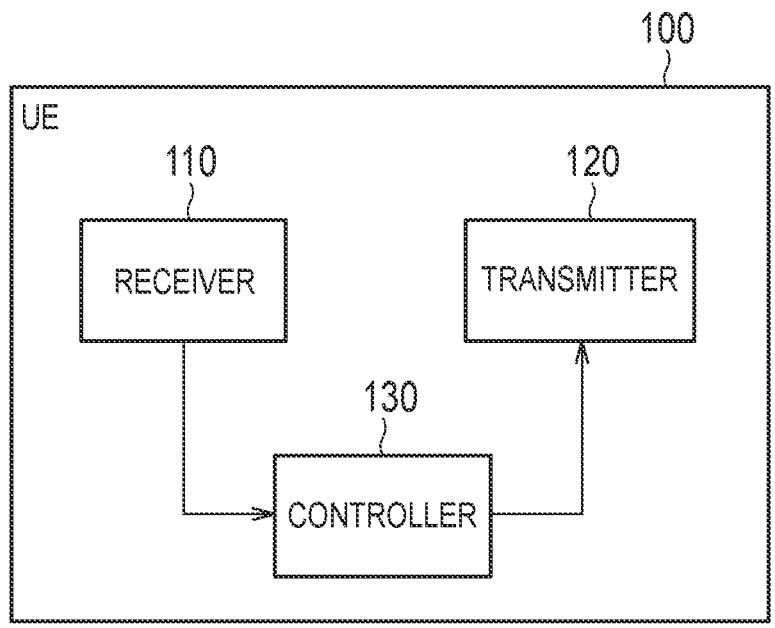
FIG. 5 is a block diagram of a UE 100.

The UE 100 (radio terminal) will be described. FIG. 5 is a block diagram of the UE 100. As illustrated in FIG. 5, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, as well as coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100.

For simplicity, a process executed by at least any one of the receiver 110, the transmitter 120, and the controller 130 included in the UE 100 may be described herein as a process (operation) executed by the UE 100.

(Base Station)

Figure 6:
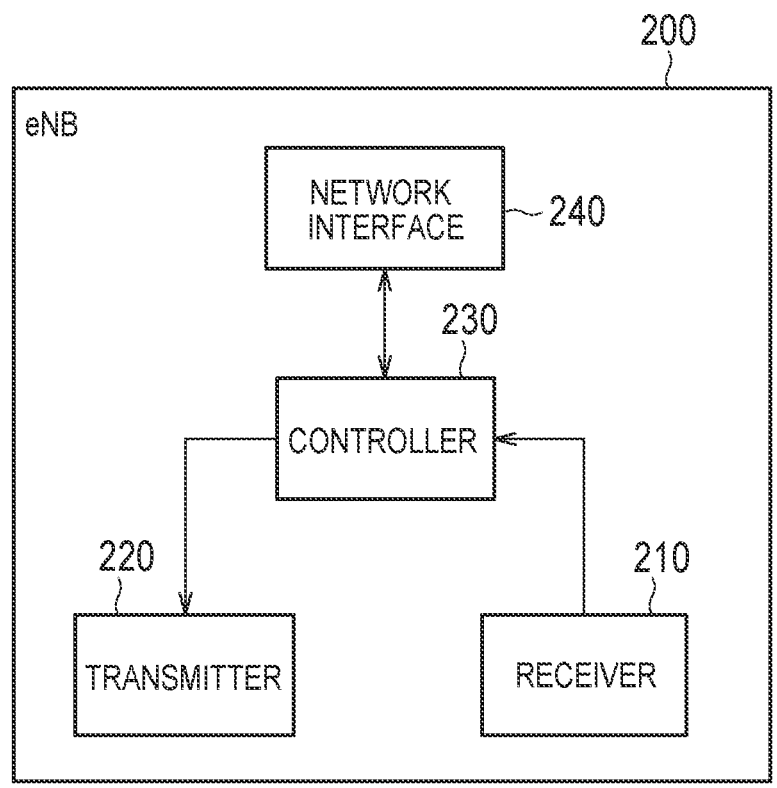
FIG. 6 is a block diagram of an eNB 200.

The eNB 200 (base station) will be described. FIG. 6 is a block diagram of the eNB 200. As illustrated in FIG. 6, the eNB 200 includes a receiver 210, a transmitter 220, a controller 230, and a network interface 240. The transmitter 210 and the receiver 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs modulation and demodulation, coding and decoding, and the like, of the baseband signal. The CPU executes a program stored in the memory to perform various types of processes. The processor executes various types of processes described later, and various types of communication protocols described above.

The network interface 240 is connected to an adjacent eNB 200 via the X2 interface. The network interface 240 is connected to the MME 300 and the SGW 400 via the S1 interface. The network interface 240 is used in communication performed on the X2 interface and communication performed on the S1 interface, for example.

For simplicity, a process executed by at least any one of the transmitter 210, the receiver 220, the controller 230, and the network interface 240 included in the eNB 200 is described herein as a process (operation) executed by the eNB 200.

(Relay Node)

Figure 7:
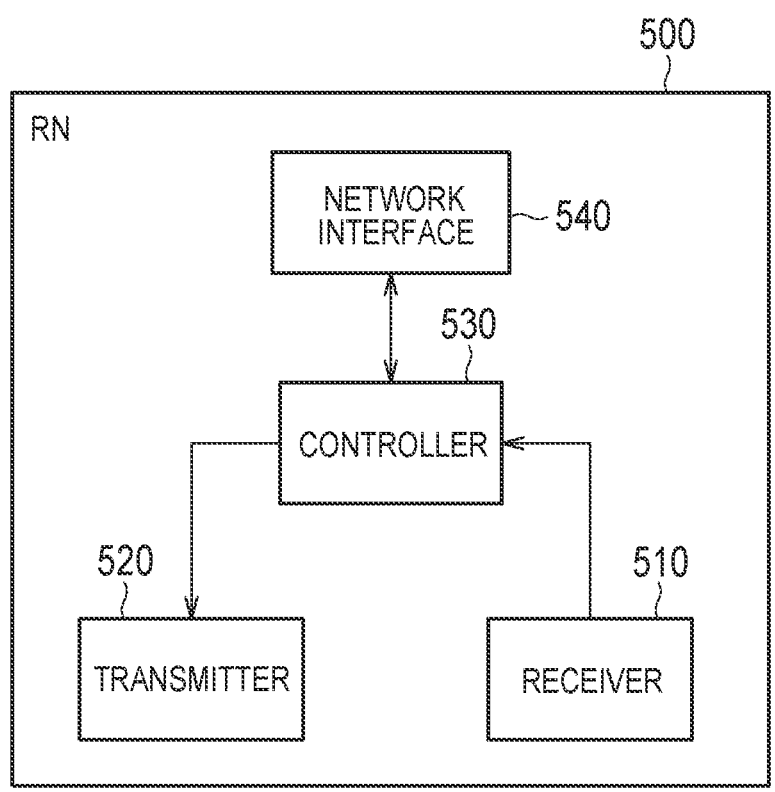
FIG. 7 is a block diagram of an RN 500.

The RN 500 (relay node) will be described. FIG. 7 is a block diagram of the RN 500. As illustrated in FIG. 7, the RN 500 includes a receiver 510, a transmitter 520, a controller 530, and a network interface 540. The transmitter 510 and the receiver 520 may be an integrated transceiver. The RN 500 may not include the network interface 540.

The receiver 510 performs various types of receptions under the control of the controller 530. The receiver 510 includes an antenna. The receiver 510 converts a radio signal received by the antenna into a baseband signal (reception signal). The receiver 510 outputs the baseband signal to the controller 530.

The transmitter 520 performs various types of transmissions under the control of the controller 530. The transmitter 520 includes an antenna. The transmitter 520 converts the baseband signal (transmission signal) output from the controller 530 into a radio signal. The transmitter 520 transmits the radio signal by the antenna.

The controller 530 performs various types of controls in the RN 500. The controller 530 includes a processor and a memory. The memory stores a program to be executed by the processor, and information to be used for a process by the processor. The processor includes a baseband processor and a CPU. The baseband processor performs modulation and demodulation, coding and decoding, and the like, of the baseband signal. The CPU executes a program stored in the memory to perform various types of processes. The processor executes various types of processes described later, and various types of communication protocols described above.

The network interface 540 is connected to another node (for example, another RN 500) provided in a moving body. It is noted that the RN 500 may perform communication with other nodes by using the receiver 510 and/or the transmitter 520. For example, the RN 500, if not including the network interface 540, may perform communication with other nodes by using the receiver 510 and/or the transmitter 520.

For simplicity, a process executed by at least any one of the transmitter 510, the receiver 520, the controller 530, and the network interface 540 included in the RN 500 is described herein as a process (operation) executed by the RN 500.

First Embodiment (Operation Environment According to First Embodiment)

Figure 8:
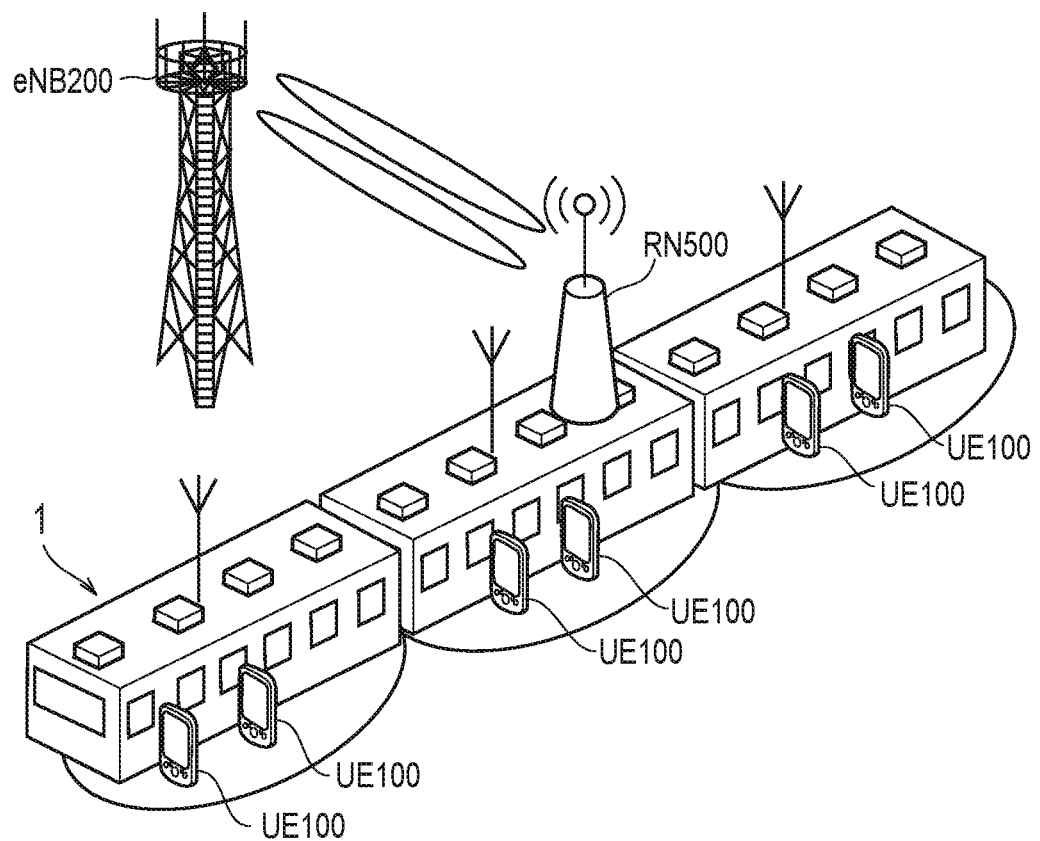
FIG. 8 is a diagram for describing an operation environment according to a first embodiment.
Figure 9:
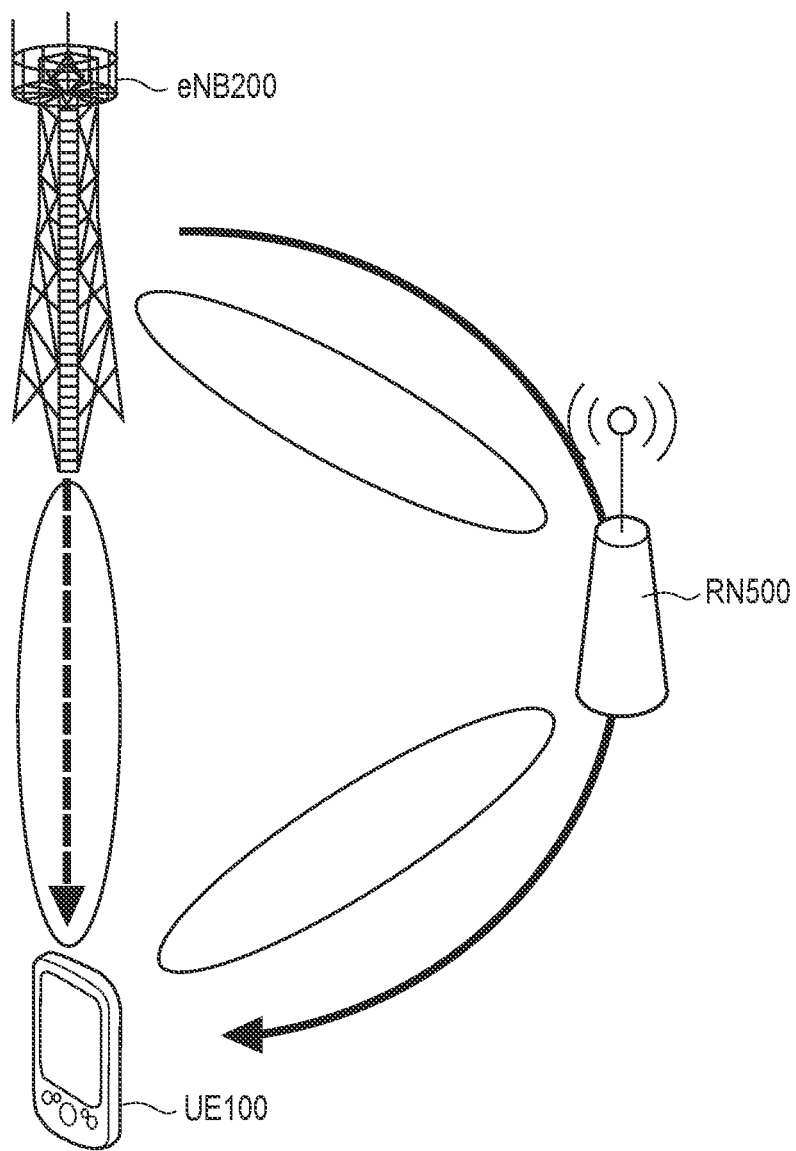
FIG. 9 is a diagram for describing an operation environment according to the first embodiment.

An operation environment according to a first embodiment will be described with reference to FIG. 8 and FIG. 9. FIG. 8 and FIG. 9 are diagrams for describing an operation environment according to the first embodiment.

As illustrated in FIG. 8, a moving body (for example, a train) 1 accommodates respective UEs 100. Further, in the moving body 1, an RN 500 is installed. Each UE 100 and the RN 500 may establish a connection (RRC connection). Each UE 100 may be in the RRC connected state to the RN 500. Each UE 100 and the RN 500 may not establish the connection (RRC connection). Each UE 100 may be in an RRC idle state to the RN 500. Each UE 100 may establish the connection (RRC connection) with the RN 500, where necessary.

The RN 500 establishes a connection (RRC connection) with an eNB 200 (for example, macro eNB). For example, the RN 500 may execute communication with the eNB 200 by using a frequency in the 4 GHz band. On the other hand, the RN 500 may execute communication with the UE 100 by using, for example, at least one of the 4 GHz band, the 30 GHz band, and the 70 GHz band.

The eNB 200 is, for example, an eNB installed around a trajectory (for example, a railway) through which the moving body 1 passes.

The moving body 1 is moving at a high speed. For example, the moving body 1 is moving at a speed equal to or higher than a threshold value (for example, 500 km/h). Therefore, each UE 100 and the RN 500 are moving at a high speed (at a speed equal to or higher than the threshold value).

In the first embodiment, as illustrated in FIG. 9, in principle, information of the UE 100 (for example, user data/packets) is transmitted to the UE 100 from the eNB 200 via the RN 500.

The UE 100 can attempt to receive the information of the UE 100 to be transmitted from the eNB 200 to the RN 500.

(Operation According to First Embodiment)

Next, an operation according to the first embodiment will be described.

(Reception in UE 100)

Figure 10:
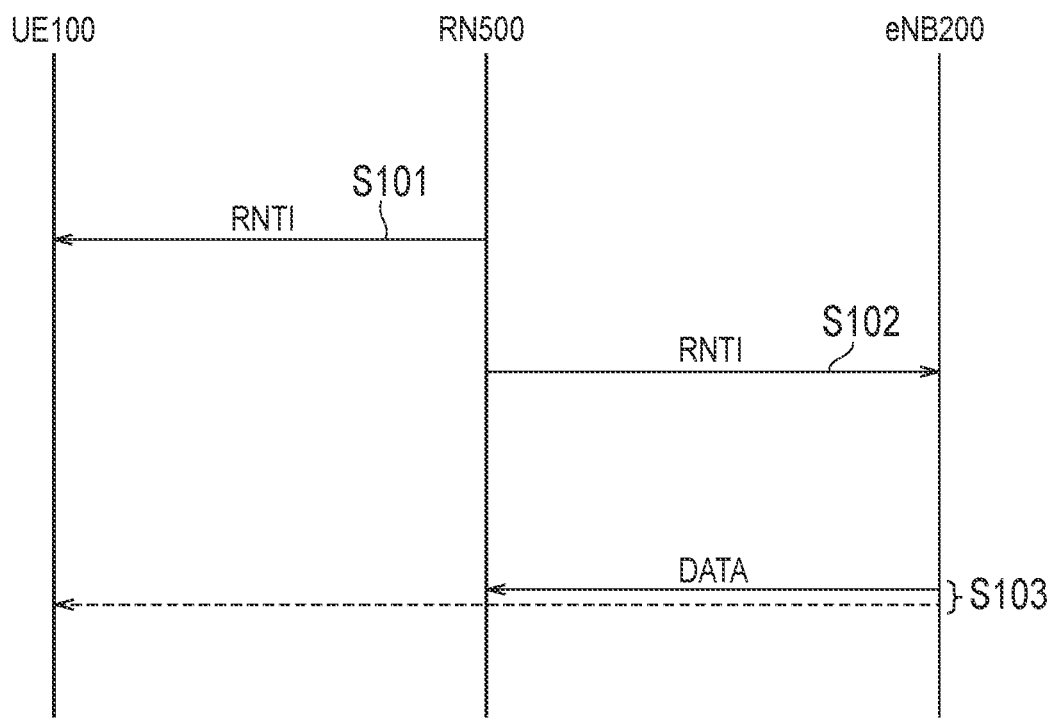
FIG. 10 is a sequence diagram for describing an operation (part 1) according to the first embodiment.
Figure 11:
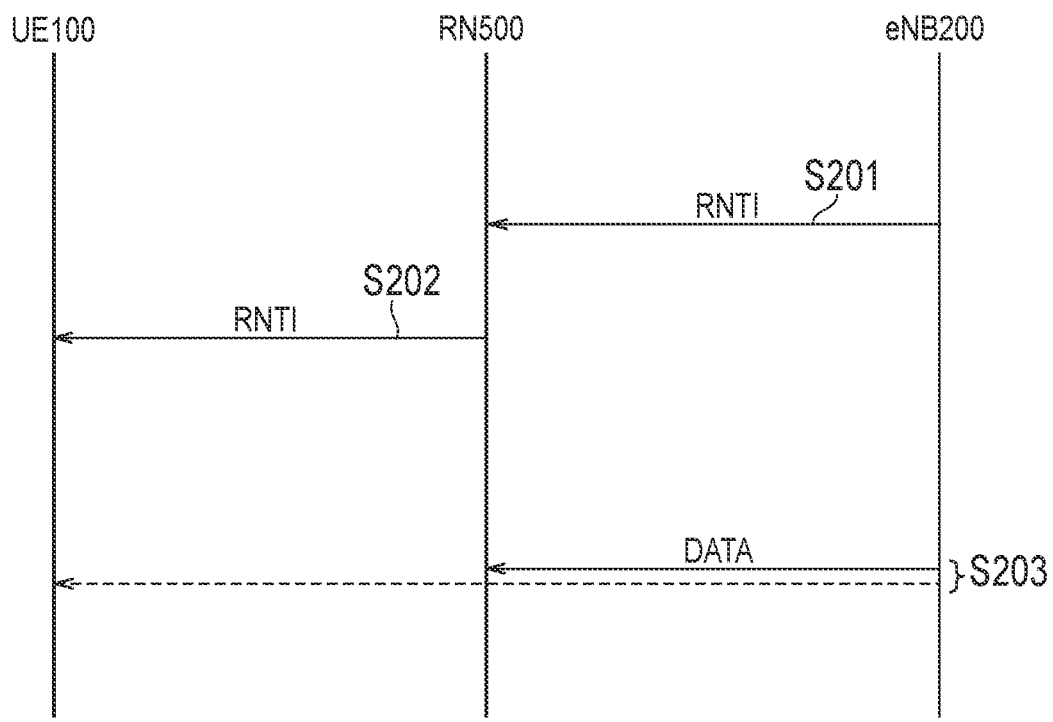
FIG. 11 is a sequence diagram for describing an operation (part 2) according to the first embodiment.

A reception in the UE 100 will be described with reference to FIG. 10 and FIG. 11. FIG. 10 is a sequence diagram for describing an operation (part 1) according to the first embodiment. FIG. 11 is a sequence diagram for describing an operation (part 2) according to the first embodiment.

The UE 100 can receive information of the UE 100 transmitted from the eNB 200 to the RN 500 by the following method.

(A) Identification Information Assigned by RN 500

As illustrated in FIG. 10, in step S101, the RN 500 assigns identification information to the UE 100. The identification information is, for example, an identifier (RNTI: Radio Network Temporary Identifier) that is temporarily assigned to the UE 100. The identification information may be a cell identifier (C-RNTI: Cell-RNTI). The identification information may be an identifier that is individually assigned to the UE 100. Alternatively, the identification information may be an identifier indicating a cell of the RN 500. Accordingly, the identification information may be an identifier in common among the respective UEs 100 in the cell of RN 500.

As described later, the identification information is used to decode the information (for example, data, control information for receiving data, and the like) of the UE 100 transmitted from the eNB 200 to the RN 500.

It is noted that the RN 500 may transmit, to each UE 100, control information (for example, information of a radio resource allocated to the RN 500, and the like) for receiving information transmitted from the eNB 200.

In step S102, the RN 500 transmits the identification information assigned to the UE 100 to the eNB 200. The eNB 200 encodes the information of the UE 100 to be transmitted to the RN 500 with the identification information received from the RN 500. If the identification information is an identifier individually assigned to the UE 100, the information of each UE 100 can be encoded with the identification information corresponding to the information of each UE 100.

In step S103, the eNB 200 transmits the encoded information (data) of the UE 100 to the RN 500. It is noted that the information of the UE 100 may be directly transmitted to the RN 500 that is the destination. That is, the identifier of the destination included in the information transmitted from the eNB 200 may be the identifier of the RN 500. Accordingly, the information of the UE 100 may not indicate that the direct destination from the eNB 200 is the UE 100.

The eNB 200 may transmit information of a plurality of UEs 100 as one piece of data to the RN 500.

The UE 100 attempts to receive information from the eNB 200. The UE 100 decodes the received information with the identification information assigned by the RN 500. If there is a possibility that the information from the eNB 200 includes information for the UE 100 itself, the UE 100 attempts to decode that information. For example, when the information from the eNB 200 is information for the RN 500, the UE 100 attempts to decode that information. When successfully decoding the received information, the UE 100 determines that the reception of the information is successful. When failing to decode the received information, the UE 100 determines that the reception of the information is failed.

When one piece of data includes information of a plurality of UEs 100 and when the UE 100 successfully decodes its own information, the UE 100 determines that the reception of the information is successful.

On the other hand, the RN 500 receives the information of the UE 100 from the eNB 200. The RN 500 decodes the received information for the UE 100 with the identification information that has been transmitted to the eNB 200. When successfully decoding the received information, the RN 500 determines that the reception of the information is successful. When failing to decode the received information, the RN 500 determines that the reception of the information is failed.

The RN 500 can relay (transmit) the received information of the UE 100 to the UE 100. It is noted that as described later, when the UE 100 determines that the the reception of the information from the eNB 200 is successful, the RN 500 may omit the transmission (relay) of the information of the UE 100.

(B) Identification Information Assigned by eNB 200

As illustrated in FIG. 11, in step S201, the eNB 200 assigns identification information to the RN 500. The identification information is, for example, an identifier (RNTI: Radio Network Temporary Identifier) that is temporarily assigned to the RN 500. The identification information may be a cell identifier (C-RNTI: Cell-RNTI). The identification information may be an identifier that is individually assigned to the RN 500. Alternatively, the identification information may be an identifier that is individually assigned to the UE 100. The identification information may be an identifier in common among the respective UEs 100 in the cell of RN 500.

In step S202, the RN 500 transmits the identification information to the UE 100. The UE 100 receives the identification information.

Step S203 corresponds to step S103.

(Data Transmission from RN 500)

Figure 12:
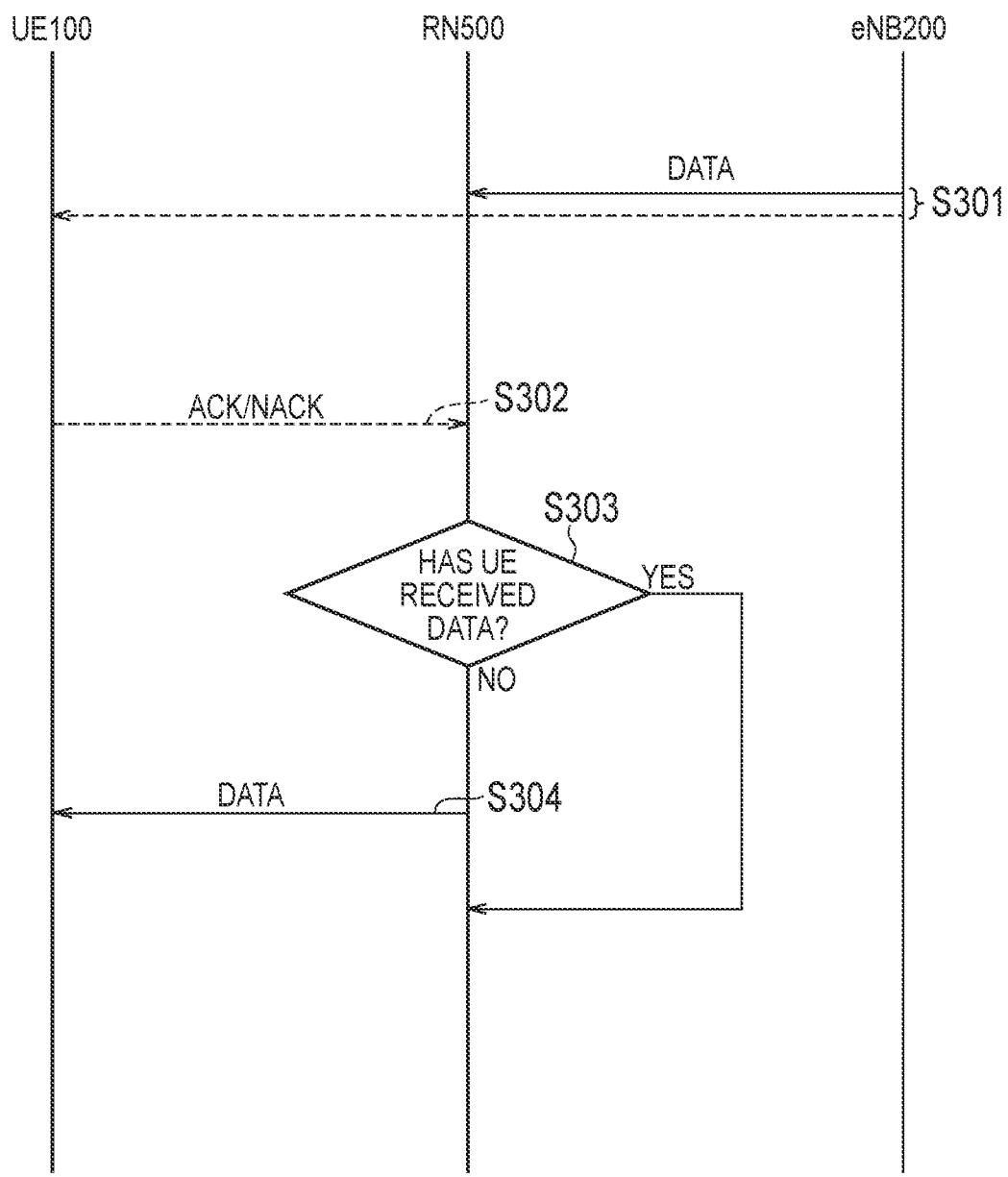
FIG. 12 is a sequence diagram for describing an operation (part 3) according to the first embodiment.

Next, data transmission (retransmission) from the RN 500 will be described with reference to FIG. 12. FIG. 12 is a sequence diagram for describing an operation (part 3) according to the first embodiment.

As illustrated in FIG. 12, step S301 corresponds to step S103 or step S203.

In step S302, the UE 100 may transmit delivery acknowledgement information to the RN 500.

The delivery acknowledgement information may indicate whether the UE 100 has received information from the eNB

200. For example, the delivery acknowledgement information may indicate that the UE 100 has received information from the eNB 200 (ACK: Acknowledge). The delivery acknowledgement information may indicate that the UE 100 has not received information from the eNB 200 (NACK: Nacknowledge).

The delivery acknowledgement information may include information indicating the content of the information successfully received. For example, the delivery acknowledgement information may include information on a sequence number of a packet successfully received. The delivery acknowledgement information may be information for requesting transmission (retransmission) of information to the RN 500. The delivery acknowledgement information may include information on a sequence number of a packet failing to be received.

The UE 100 may transmit the delivery acknowledgement information (ACK/NACK), depending on whether reception of information from the eNB 200 is successful or failed. Only when successfully receiving information from the eNB 200, the UE 100 may transmit the delivery acknowledgement information (ACK). When failing to receive information from the eNB 200, the UE 100 may not transmit the delivery acknowledgement information (NACK).

It is noted that the UE 100 can transmit the delivery acknowledgement information to the RN 500 before the RN 500 transmits information from the eNB 200 to the UE 100.

In step S303, the RN 500 determines whether the UE 100 has received information from the eNB 200.

For example, the RN 500 may perform the determination based on the delivery acknowledgement information. For example, when receiving the delivery acknowledgement information indicating ACK (reception success) before transmitting information from the eNB 200, the RN 500 may determine that the UE 100 has received the information from the eNB 200. On the other hand, when receiving the delivery acknowledgement information indicating NACK (reception failure) before transmitting information from the eNB 200, the RN 500 may determine that the UE 100 has not received the information from the eNB 200.

In addition, when not receiving delivery acknowledgement information even if a predetermined time has passed since the reception of information from the eNB 200, the RN 500 may determine that the UE 100 has not received the information from the eNB 200. The predetermined time is, for example, the time from when the RN 500 receives the information from the eNB 200 to when the RN 500 transmits the information to the UE 100. The RN 500 may start a timer for measuring the predetermined time in response to receiving the information from the eNB 200. The RN 500 may stop the timer in response to receiving the delivery acknowledgement information.

When the UE 100 has not received information from the eNB 200 (when the UE 100 fails to receive information from the eNB 200), the RN 500 executes the process of step S304. On the other hand, when the UE 100 has received information from the eNB 200 (when the UE 100 successfully receives information from the eNB 200), the RN 500 ends the process. That is, the RN 500 omits the process of step S304.

In step S304, the RN 500 transmits the information from the eNB 200 to the UE 100.

The RN 500 may transmit (relay) the information to the UE 100 in response to receiving the delivery acknowledgement information indicating NACK (reception failure). When not receiving delivery acknowledgement information from the UE 100, the RN 500 may transmit (relay) the information to the UE 100.

On the other hand, the RN 500 may stop transmitting (relaying) the information from the eNB 200 in response to receiving the delivery acknowledgement information indicating ACK (reception success). Accordingly, when the UE 100 successfully receives the information from the eNB 200, the RN 500 may stop transmitting the information from the eNB 200. That is, the RN 500 may not transmit the information from the eNB 200 (transmission of the information from the eNB 200 may be omitted).

Thus, the UE 100 can assist communication between the eNB 200 and the RN 500. For example, it is effective when the communication throughput between the eNB 200 and the RN 500 is low due to high-speed movement. Further, since the RN 500 can omit relaying information to the UE 100, the load on the RN 500 can be reduced.

(Delivery Acknowledgement Information from RN 500 to eNB 200)

Figure 13:
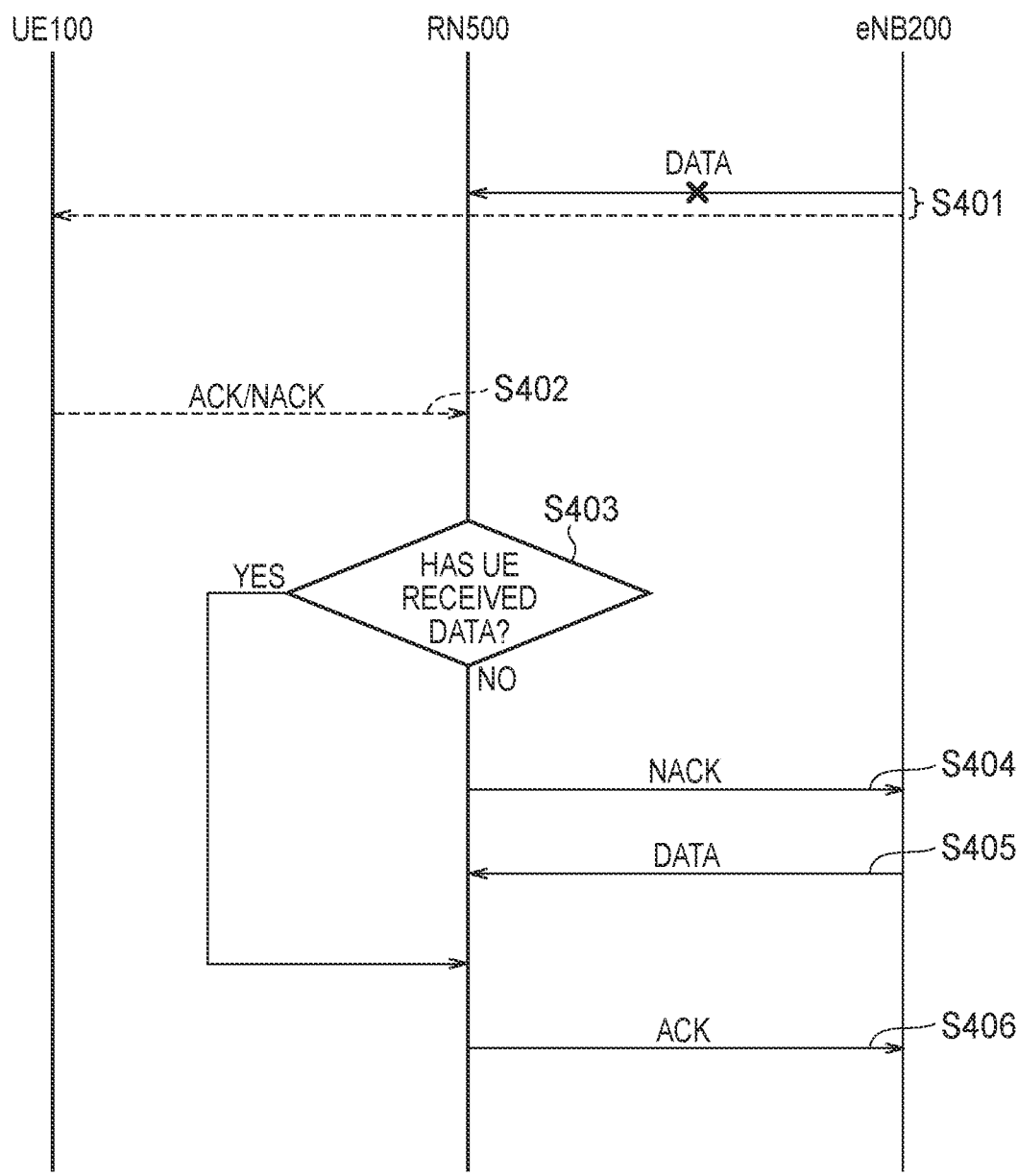
FIG. 13 is a sequence diagram for describing an operation (part 4) according to the first embodiment.

Next, the delivery acknowledgement information from the RN 500 to the eNB 200 will be described with reference to FIG. 13. FIG. 13 is a sequence diagram for describing an operation (part 4) according to the first embodiment.

As illustrated in FIG. 13, step S401 corresponds to step S301. It is assumed here that the RN 500 has failed to receive the information of the UE 100 from the eNB 200.

Step S402 corresponds to step S302. It is noted that in step S402, the UE 100 can transmit delivery acknowledgement information to the RN 500 before the RN 500 transmits delivery acknowledgement information (see step S404 or S406). The UE 100 may transmit the delivery acknowledgement information to the RN 500 at a timing earlier than a conventional transmission timing of delivery acknowledgement information (for example, a timing of 4 ms from the reception of the information). Because of the shorter transmission time interval (TTI) than the conventional interval, the UE 100 may transmit the delivery acknowledgement information to the RN 500 before the RN 500 transmits the delivery acknowledgement information.

Since the timing at which the RN 500 transmits the delivery acknowledgement information to the eNB 200 is later than the existing transmission timing, the UE 100 may be able to transmit the delivery acknowledgement information to the RN 500 before the RN 500 transmits the delivery acknowledgement information. The timing at which the delivery acknowledgement information is transmitted from the RN 500 may be set by the eNB 200. Further, the RN 500 may notify (request) the timing of transmitting the delivery acknowledgement information to the eNB 200.

Step S403 corresponds to step S303. In step S403, when the UE 100 fails to receive information from the eNB 200, the RN 500 can transmit, to the eNB 200, the delivery acknowledgement information indicating reception failure (NACK) of the information from the eNB 200. The delivery acknowledgement information may be information for requesting retransmission of the information of the UE 100 already transmitted from the eNB 200. Accordingly, when both the RN 500 itself and the UE 100 fail to receive information from the eNB 200, the RN 500 can transmit the delivery acknowledgement information indicating NACK to the eNB 200.

On the other hand, when the UE 100 successfully receives the information from the eNB 200, the RN 500 executes the process of step S406.

In step S405, the eNB 200 retransmits information (data) of the UE 100 to the RN 500 in response to receiving the delivery acknowledgement information indicating NACK. The RN 500 transmits (relays) the received information of the UE 100 to the UE 100.

In step S406, when the UE 100 successfully receives information from the eNB 200, the RN 500 can transmit, to the eNB 200, the delivery acknowledgement information indicating reception success (ACK) of the information from the eNB 200. Accordingly, even when the RN 500 itself (the receiver 210) fails to receive information from the eNB 200, the RN 500 can stop transmitting a retransmission request (delivery acknowledgement information indicating NACK) to the eNB 200 in response to receiving the delivery acknowledgement information indicating ACK.

Thus, since the retransmission from the eNB 200 to the RN 500 can be omitted, the UE 100 can assist the communication between the eNB 200 and the RN 500. For example, it is effective when the communication throughput between the eNB 200 and the RN 500 is low due to high-speed movement.

It is noted that the RN 500 may transmit a retransmission request to the eNB 200 when the RN 500 itself fails to receive information from the eNB 200, irrespective of whether the UE 100 has successfully received information from the eNB 200.

(First Modification of First Embodiment)

Figure 14:
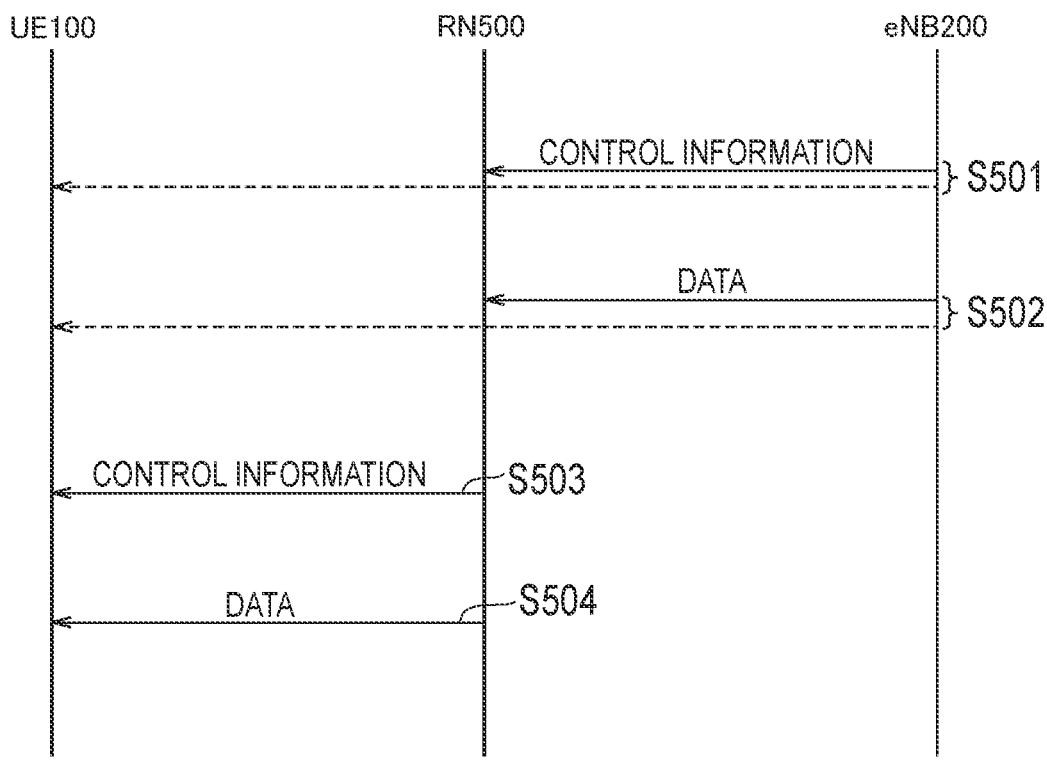
FIG. 14 is a sequence diagram for describing an operation according to a first modification of the first embodiment.

Next, a first modification of the first embodiment will be described with reference to FIG. 14. FIG. 14 is a sequence diagram for describing an operation according to the first modification of the first embodiment. Description of parts similar to those described above will be omitted where appropriate.

In the first modification, the UE 100 attempts to receive control information from the eNB 200.

As illustrated in FIG. 14, the eNB 200 transmits control information to the RN 500. The control information may include information for receiving information (data (user data)) of the UE 100 from the eNB 200 to the RN 500. The control information may include information for receiving information (data (user data)) of the UE 100 from the UE 100 to the eNB 200. The information for receiving the information of the UE 100 may be, for example, resource information (information on time-frequency resource) used to transmit the information of the UE 100. The control information may be transmitted by the PDCCH.

The RN 500 receives the control information from the eNB 200. The UE 100 attempts to receive the control information. The following description assumes that the UE 100 has successfully received the control information.

Since the coding rate of the control information is lower than that of the user data, the control information is easier to receive than the user data. Accordingly, the UE 100 may attempt to receive the control information from the eNB 200, and may not attempt to receive the user data of the UE 100 from the eNB 200.

When receiving the control information, the UE 100 may transmit information for omitting transmission at S503 to the RN 500.

Step S502 corresponds to step S103. The UE 100 may receive information (user data) from the eNB 200 based on the control information from the eNB 200.

It is noted that the following description assumes that the UE 100 has not received the information from the eNB 200.

In step S503, the RN 500 transmits the control information to the UE 100. The control information includes resource information used to transmit information of the UE 100 from the RN 500 to the UE 100. The control information may be information included in the control information from the eNB 200.

If the UE 100 has successfully received the resource information from the eNB 200, the UE 100 may stop reception at the receiver 110 until the process of step S504 is executed. For example, the UE 100 may stop reception at the receiver 110 until the process of step S504 is executed after the reception is successful in step S501. The UE 100 may stop reception at the receiver 110 by discontinuous reception (DRX). That is, the UE 100 may stop (halt) monitoring the control information from the RN 500.

When the UE 100 has received the control information, the RN 500 may omit the transmission of the control information.

In step S504, the RN 500 transmits (relays) the user data of the UE 100 to the UE 100 by using the resource information included in the control information from the eNB 200. The UE 100 receives the user data of the UE 100 from the RN 500 by using the resource information included in the control information from the eNB 200.

When the UE 100 successfully receives the data in step S502, the UE 100 may cancel the processes in steps S503 and S504.

As described above, the UE 100 can stop (halt) monitoring the control information from the RN 500 even at the transmission timing of the control information from the RN 500 by receiving the control information from the eNB 200. The power consumption of the UE 100 can be reduced.

(Second Modification of First Embodiment)

Figure 15:
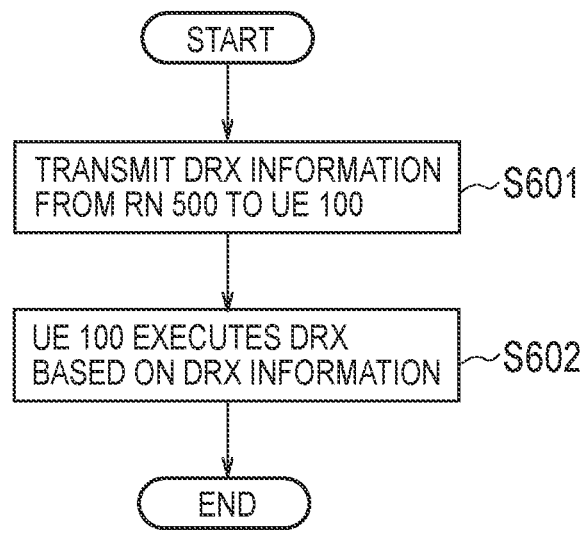
FIG. 15 is a flowchart for describing an operation according to a second modification of the first embodiment.

Next, a second modification of the first embodiment will be described with reference to FIG. 15. FIG. 15 is a flowchart for describing an operation according to the second modification of the first embodiment. Description of parts similar to those described above will be omitted where appropriate.

In the second modification, the UE 100 and the RN 500 coincide on the DRX timing.

As illustrated in FIG. 15, in step S601, the RN 500 transmits the DRX information to the UE 100. The DRX information includes information on a period in which the RN 500 monitors radio signals (in particular, information of the UE 100) from the eNB 200 during discontinuous reception (DRX). The DRX information may be information set by the eNB 200 in the RN 500.

The RN 500 may transmit the DRX information in response to a request from the UE 100. The RN 500 may transmit the DRX information determined by the RN 500 itself to the eNB 200.

In step S602, the UE 100 starts a DRX operation based on the DRX information. Accordingly, the UE 100 and the RN 500 coincide on the period in which radio signals from the eNB 200 are monitored (received) during discontinuous reception (DRX).

As described above, the UE 100 can attempt to receive the information of the UE 100 from the eNB 200 even during the DRX.

Second Embodiment

Next, a second embodiment will be described. In the second embodiment, the UE 100 and the eNB 200 establish a connection. Description of parts similar to those in the first embodiment will be omitted where appropriate.

(Operation Environment According to Second Embodiment)

Figure 16:
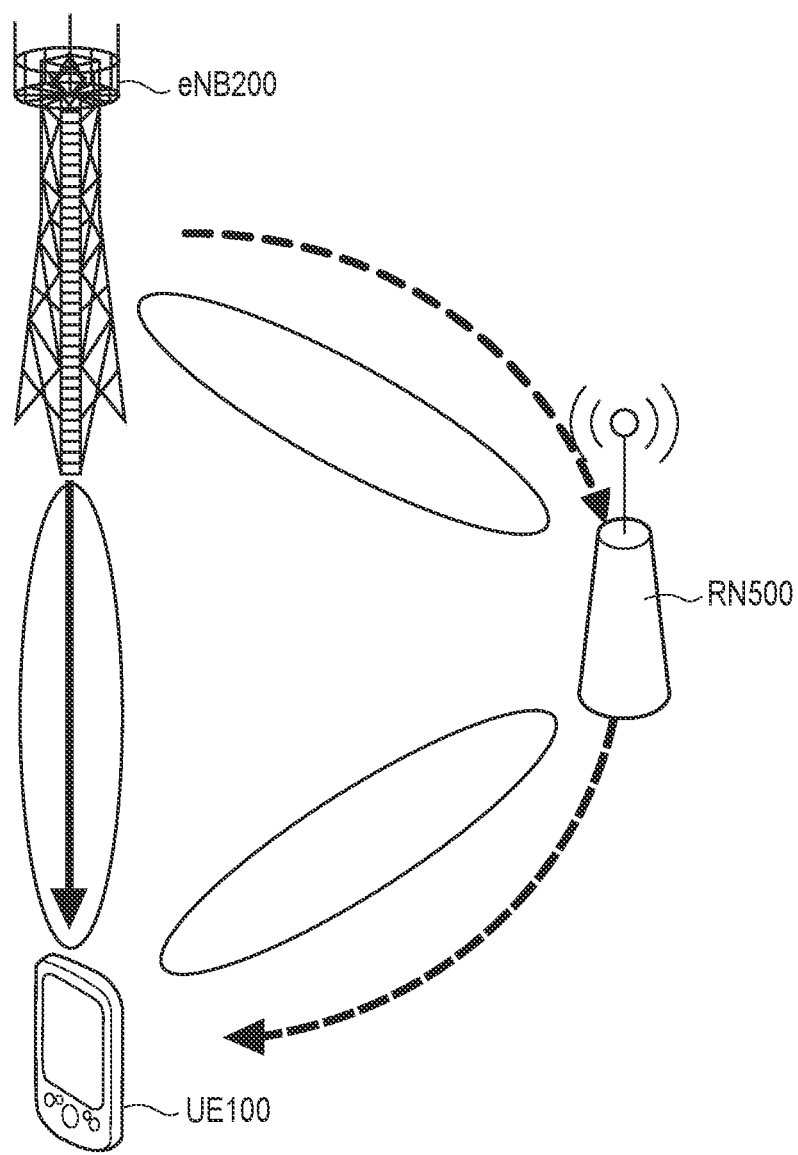
FIG. 16 is a diagram for describing an operation environment according to a second embodiment.

An operation environment according to the second embodiment will be described with reference to FIG. 16. FIG. 16 is a diagram for describing the operation environment according to the second embodiment.

In the second embodiment, the UE 100 and the eNB 200 have established a connection (RRC connection). The UE 100 may be in an RRC idle state to the eNB 200. The UE 100 may establish a connection (RRC connection) with the eNB 200, where necessary.

The UE 100 may establish a connection (RRC connection) with the eNB 200. Alternatively, the UE 100 may be in an RRC idle state to the RN 500. The UE 100 may establish a connection (RRC connection) with the RN 500, where necessary.

The RN 500 may establish a connection (RRC connection) with the eNB 200. Alternatively, the RN 500 may establish a connection (RRC connection) with the eNB 200, where necessary.

As illustrated in FIG. 16, in principle, information of the UE 100 (for example, user data/packets) is transmitted to the UE 100 from the eNB 200 without passing through the RN 500.

The RN 500 can attempt to receive the information of the UE 100 to be transmitted from the eNB 200 to the UE 100. The RN 500 may transmit (retransmit) the information of the UE 100 to the UE 100.

(Operation According to Second Embodiment)

Figure 17:
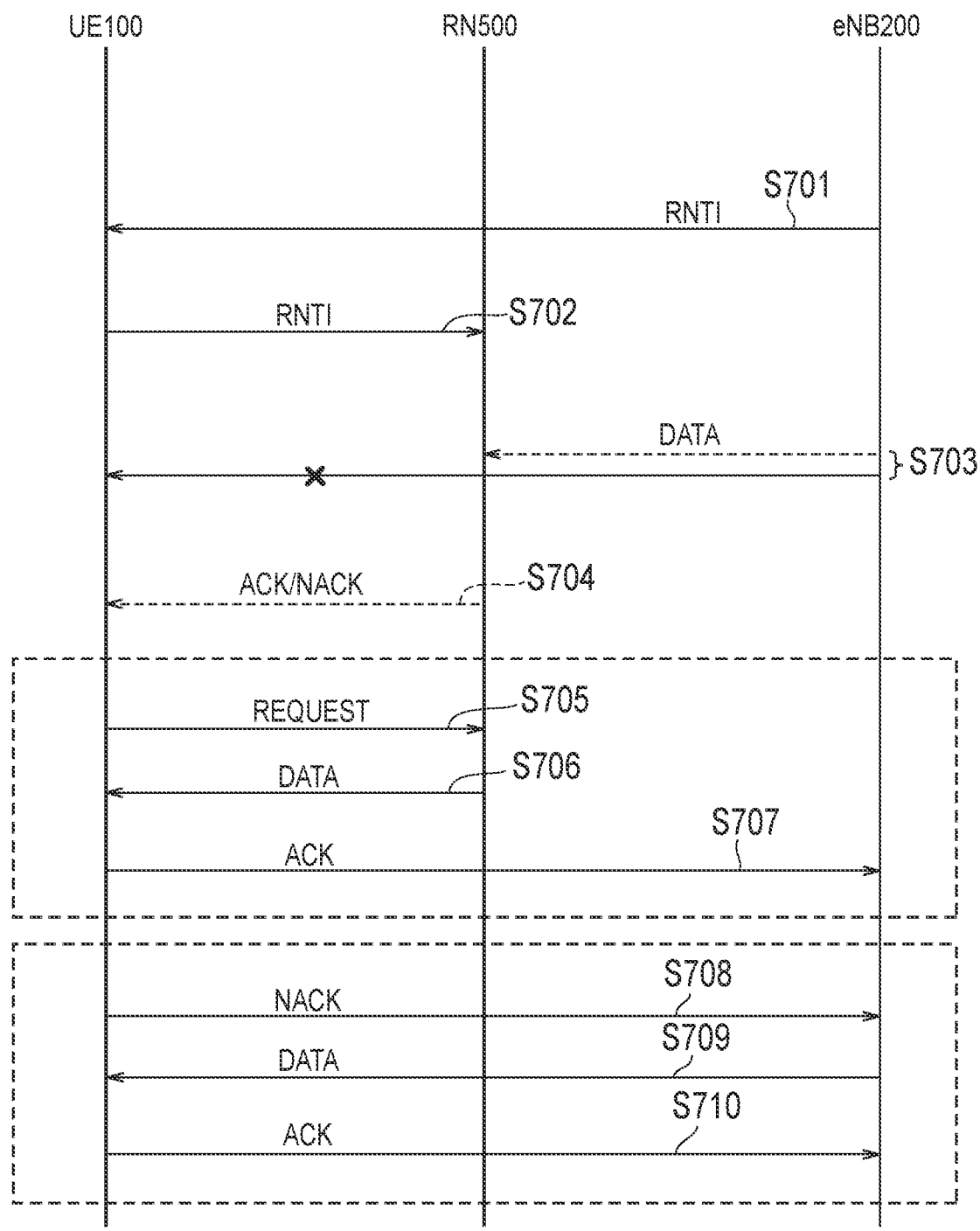
FIG. 17 is a sequence diagram for describing an operation according to the second embodiment.

Next, an operation according to the second embodiment will be described with reference to FIG. 17. FIG. 17 is a sequence diagram for describing the operation according to the second embodiment.

As illustrated in FIG. 17, in step S701, the eNB 200 assigns identification information to the UE 100. The identification information is used to decode information from the eNB 200 to the UE 100. The identification information may be the same information (for example, C-RNTI) as that in the first embodiment.

In step S702, the UE 100 transmits the identification information assigned by the eNB 200 to the RN 500. The RN 500 receives the identification information.

In step S703, the eNB 200 transmits the information (data) of the UE 100 to the UE 100. The information of the UE 100 may be information encoded with the identification information assigned to the UE 100.

The RN 500 attempts to receive the information of the UE 100. The RN 500 decodes the received information with the identification information received from the UE 100. When successfully decoding the received information, the RN 500 determines that the reception of the information of the UE 100 is successful. When failing to decode the received information, the RN 500 determines that the reception of the information of the UE 100 is failed.

When receiving the information of the UE 100 from the eNB 200, the UE 100 executes the process of step S707. On the other hand, when failing to receive the information of the UE 100, the UE 100 executes the following processes.

The following description assumes that the UE 100 has failed to receive the information of the UE 100.

In step S704, the RN 500 may transmit delivery acknowledgement information to the UE 100. The delivery acknowledgement information may indicate whether the RN 500 has received information from the eNB 200. The delivery acknowledgement information may indicate that the RN 500 has received information from the eNB 200 (ACK). The delivery acknowledgement information may indicate that the RN 500 has not received information from the eNB 200 (NACK). As in the manner described above, it may be the same information as the delivery acknowledgement information from the UE 100 to the RN 500.

The RN 500 may transmit the delivery acknowledgement information (ACK/NACK), depending on whether the reception of information from the eNB 200 is successful or failed. Only when successfully receiving information from the eNB 200, the RN 500 may transmit the delivery acknowledgement information (ACK). When failing to receive information from the eNB 200, the RN 500 may not transmit the delivery acknowledgement information (NACK). Only when failing to receive information from the eNB 200, the RN 500 may transmit the delivery acknowledgement information (NACK). When successfully receiving information from the eNB 200, the RN 500 may not transmit the delivery acknowledgement information (ACK).

When the RN 500 has successfully received the information from the eNB 200, the UE 100 executes the process of step S705. On the other hand, when the RN 500 has failed to receive the information from the eNB 200, the UE 100 executes the process of step S706.

In step S705, the UE 100 transmits a transmission request for information of the UE 100 (retransmission request) to the RN 500. When the UE 100 itself (the receiver 110) fails to receive information of the eNB 200, the UE 100 may transmit a retransmission request.

Only when receiving the delivery acknowledgement information indicating ACK from the RN 500, the UE 100 may transmit a retransmission request to the RN 500.

The retransmission request may be the delivery acknowledgement information of the first embodiment described above.

In step S706, the RN 500 transmits the information (data) of the UE 100 to the UE 100. The RN 500 transmits the information (data) of the UE 100 to the UE 100. Only when receiving the retransmission request, the RN 500 may transmit the information of the UE 100 to the UE 100. When not receiving a retransmission request from the UE 100 even if a predetermined time has passed since the reception of information from the eNB 200, the RN 500 may transmit the information of the UE 100 to the UE 100.

The UE 100 receives the information of the UE 100 from the RN 500.

In step S707, the UE 100 transmits the delivery acknowledgement information indicating ACK to the eNB 200. Even when the UE 100 itself has failed to receive the information of the UE 100, the UE 100 may transmit the delivery acknowledgement information indicating ACK to the eNB 200 in response to receiving the information of the UE 100 from the RN 500.

On the other hand, in step S708, the UE 100 transmits a retransmission request to the eNB 200. The retransmission request may be the delivery acknowledgement information indicating NACK. The eNB 200 retransmits the information (data) of the UE 100. The UE 100 receives the information of the UE 100. The UE 100 transmits the delivery acknowledgement information indicating ACK to the eNB 200.

Thus, the RN 500 can assist communication between the UE 100 and the eNB 200. For example, it is effective when the communication throughput between the UE 100 and the eNB 200 is low due to high-speed movement. Further, since the RN 500 can omit relaying information to the UE 100, the load on the RN 500 can be reduced.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In each of the above-described embodiments, the case where one RN 500 installed in the moving body 1 communicates with the UE 100 has been described. In the moving body 1, a plurality of RNs 500 may be installed. In each of a plurality of cargos constituting the moving body 1, the RN 500 may be installed. For example, as illustrated in FIG. 8, an antenna of the RN 500 may be installed at the top of each cargo. The UE 100 and the RN 500 located in the same cargo may execute communication (transmission and/or reception). Each RN 500 may execute communication (transmission and/or reception) with the eNB 200. Alternatively, on behalf of other RNs 500, one RN 500 (representative RN 500) may execute communication with the eNB 200. The representative RN 500 may execute communication with each of the other RNs 500 (for example, via the network interface 540).

In each of the embodiments described above, the relay node may be a relay UE (ProSe UE-to Network Relay) configured to execute a relay using a proximity-based service (ProSe: Proximity-based Services).

The operation according to each of the above-described embodiments may be combined to be executed, where appropriate. Further, in each of the above-described sequences, all of the operations may not necessarily be essential configurations. For example, in each sequence, only some of the operations may be executed.

Although not particularly mentioned in each of the above-described embodiments, a program for causing a computer to execute each process performed by any one of the above-described nodes (such as the UE 100, the eNB 200, and the RN 500) may be provided. Further, the program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a recording medium such as a CD-ROM and a DVD-ROM, for example.

Alternatively, a chip may be provided which is configured by: a memory configured to store a program for performing each process performed by any one of the UE 100, eNB 200, and the RN 500; and a processor configured to execute the program stored in the memory.

In the above-described embodiments, an LTE system is described as an example of the mobile communication system; however, the LTE system is not an exclusive example, and the content according to the present application may be applied to a system other than the LTE system.

INDUSTRIAL APPLICABILITY

The present invention is useful in the field of communication.

The invention claimed is:

1. A relay node, comprising:
a controller configured to establish a connection with a radio terminal and to establish a connection with a base station;
a receiver configured to receive information of the radio terminal from the base station; and
a transmitter configured to transmit the information to the radio terminal, wherein
the receiver is configured to receive delivery acknowledgement information from the radio terminal before the information is transmitted,
the delivery acknowledgement information indicates that the radio terminal has received the information, and
the transmitter is configured to
transmit, to the radio terminal, information on a period in which the relay node monitors a radio signal from the base station during discontinuous reception, and
stop transmitting the information to the radio terminal in response to reception of the delivery acknowledgement information.

2. The relay node according to claim 1, wherein
the transmitter is configured to transmit a retransmission request for the information to the base station when the receiver fails to receive the information, and
the transmitter is configured to, even when the receiver has failed to receive the information, stop transmitting the retransmission request to the base station in response to reception of the delivery acknowledgement information.

3. The relay node according to claim 1, wherein
the transmitter is configured to transmit identification information used to decode the information to the radio terminal, and
the identification information is information that is assigned to the relay node by the base station.

4. The relay node according to claim 1, wherein
the transmitter is configured to transmit identification information used to decode the information to both the radio terminal and the base station, and
the identification information is information that is assigned to the radio terminal by the relay node.

5. The relay node according to claim 1, wherein
the receiver is configured to receive control information from the base station, and
the control information includes resource information used for which the relay node transmits the information to the radio terminal.

6. A radio terminal, comprising:
a controller configured to establish a connection with a relay node;
a receiver configured to
attempt to receive, from a base station, information of the radio terminal to the relay node, and
receive information on a period in which the relay node monitors a radio signal from the base station during discontinuous reception; and
a transmitter configured to transmit, in response to successful reception of the information from the base station, delivery acknowledgement information indicating that the radio terminal has received the information to the relay node.

7. The radio terminal according to claim 6, wherein
the receiver is configured to receive identification information used to decode the information from the relay node, and the identification information is information that is assigned to the relay node by the base station.

8. The radio terminal according to claim 6, wherein
the receiver is configured to receive identification information used to decode the information from the relay node, and
the identification information is information that is assigned to the radio terminal by the relay node.

9. The radio terminal according to claim 6, wherein
the receiver is configured to receive control information from the base station,
the control information includes resource information used for which the relay node transmits the information to the radio terminal, and
the receiver is configured to receive the information from the relay node based on the resource information.

* * * * *